(12) United States Patent
Dai

(10) Patent No.: US 6,631,393 B1
(45) Date of Patent: Oct. 7, 2003

(54) METHOD AND APPARATUS FOR SPECULATIVE ADDITION USING A LIMITED CARRY

(75) Inventor: Xia Dai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 09/002,173

(22) Filed: Dec. 31, 1997

(51) Int. Cl.⁷ .................................................. G06F 7/50
(52) U.S. Cl. ........................................................ 708/710
(58) Field of Search ................................ 708/710, 711, 708/712, 713, 714

(56) References Cited

U.S. PATENT DOCUMENTS 4,761,760 A * 8/1988 Tomoji ........................ 708/714

5,483,478 A * 1/1996 Chiang ........................ 708/710

* cited by examiner

*Primary Examiner*—Chuong Dinh Ngo
(74) *Attorney, Agent, or Firm*—Blakely, Sokoloff, Taylor & Zafman LLP

(57) ABSTRACT

One embodiment of the present invention, an eight bit binary adder with a typical latency independent of its width, is described. The adder comprises a four bit adder for calculating bits $S_3$–$S_0$ of the sum, plus four bitslice circuits, one for speculatively calculating each of bits $S_7$–$S_4$ of the sum. The calculation of the carry bit out of each bitslice is limited to the operands bits into that bitslice and the three preceding bitslices. Each bitslice also includes circuitry for detecting a potential error in the speculative sum such that the speculative sum can be corrected when there is a potential error.

11 Claims, 2 Drawing Sheets

METHOD AND APPARATUS FOR SPECULATIVE ADDITION USING A LIMITED CARRY

FIELD OF THE INVENTION

The present invention relates to the field of computer arithmetic and more particularly to the field of binary addition.

BACKGROUND OF THE INVENTION

Two of the most critical factors in determining the performance of a computer system are the internal clock frequency and the datapath width of the processor. A far more powerful computer system can be built with a 200 MHz, 32 bit processor than with a 8 MHz, 8 bit processor. However, there is an inherent conflict between these two factors in a key component of a processor, a binary adder. The conflict results from the dependence of the latency on the width of a typical binary adder. For example, the latency of a parallel ripple adder depends on the operand width because sufficient time must be allowed for a carry bit to propagate through one adder stage for every bit of the operand width. The latency can be reduced by using a carry lookahead technique wherein the carry bits into every stage can be calculated simultaneously by expressing every carry bit as a function of all of the preceding, simultaneously available operand bits. However, the carry lookahead technique is limited by the fan-in restrictions of the circuit technology, in that additional levels of logic are needed as the number of inputs to the highest order stage increases. These additional levels increase the latency, so again, the latency depends on the operand width. In response to this dependence of adder latency on adder width, a novel approach to binary addition has been developed.

SUMMARY OF THE INVENTION

An adder for calculating an N bit sum from an N bit augend and an N bit addend is disclosed. The adder comprises a first circuit for speculatively calculating bit N−1 of the sum based only on bit N−1 of the augend, bit N−1 of the addend, and a limited carry bit. The adder also comprises a second circuit for calculating the limited carry bit based only on K bits of the augend and K bits of the addend, where K is less than N−1. The adder also comprises a third circuit for detecting a potential difference between the limited carry bit and an unlimited carry bit.

DETAILED DESCRIPTION OF A PREFERRED EMBODIMENT

Figure 1:
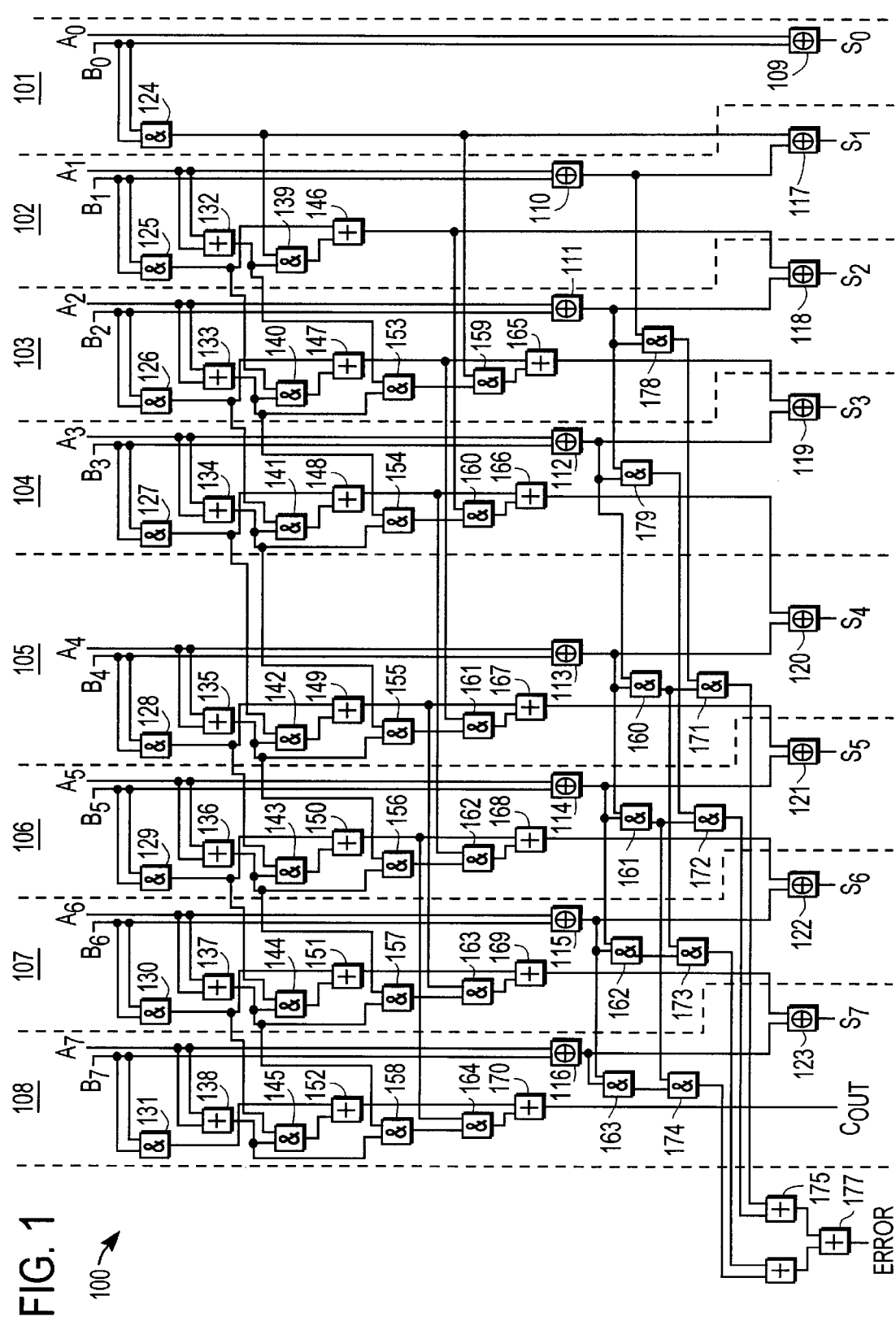
FIG. 1 is a block diagram illustrating one embodiment of a binary adder according to the present invention.

A method and apparatus for speculative addition using a limited carry is described. In the following description, specific details are set forth in order to provide a thorough understanding of the present invention. It will be apparent, however, to one skilled in the art that the present invention can be practiced without regard to these specific details. In other instances, well known concepts have not been described in particular detail in order to avoid obscuring the present invention.

The present invention takes advantage of the concept that the probability that a carry will propagate through a given number of adder stages decreases as the number of adder stages increases. Therefore, for an N bit adder, all of the bits of a sum higher than a number K+1 can be speculatively calculated assuming that a carry will not survive through K stages. The latency of calculating the speculative sum depends on K rather than N. Aside from an overflow condition, the speculative sum can be inaccurate only under the condition that for any of the N−(K+1) highest order stages, no carry is generated in the preceding K stages but a carry could propagate through the preceding K stages. If the latter condition exists, the speculative sum can be corrected. For a given N, K can be chosen such that the correction rate is acceptably low and the adder can be used with a clock frequency according to the typical latency of the adder, that is, the latency of calculating the speculative sum. For a given K, N can be increased without increasing the typical latency. Thus, one advantage of the present invention is that it can be used to design an adder with a typical latency that is independent of the adder width. Another advantage of the present invention is that it can be used to design an adder in which all of the N−K highest order stages have an identical circuit configuration, thereby increasing the potential for layout efficiency.

The probability that a carry will propagate through a given number of consecutive adder stages is referred to as the carry survival rate. To illustrate how the present invention takes advantage of the dependence of the carry survival rate on K, the number of stages to which the carry is limited, consider a 32 bit adder wherein K is 16. For this adder, the carry into each of the highest order 15 stages is limited to the preceding 16 stages. Any given stage will propagate a carry if either operand into that stage is a logical one. If both operands are a logical one, then there will be a carry out of that stage whether or not there is a carry into that stage. Therefore, a carry-in will survive, i.e. cause there to be a carry-out, only when one and only one of the operands is a logical one. Thus, the carry survival rate through one stage is 50%. The carry survival rate through K consecutive stages is 50% to the $K^{th}$ power. When K is 16, the carry survival rate is 0.0015%.

For any given stage in which a sum bit is calculated speculatively, the speculative sum bit is known to be accurate unless a carry could propagate through the preceding K stages. When K is 16, any given speculative sum bit is known to be accurate 99.9985% of the time (100% less 0.0015%). For a 32 bit adder with K equal to 16, the 15 highest order sum bits, plus an overflow bit, are calculated speculatively. Therefore, the speculative sum, including the overflow bit, is known to be accurate 99.976% of the time (99.9985% to the $16^{th}$ power). If the speculative sum is corrected the rest of the time, the correction rate is only 0.024%. For a 512 bit adder with K equal to 16, the correction rate is only 0.8%. Thus, very wide adders with very low correction rates and with typical latencies on the order of much narrower adders can be designed using the present invention.

FIG. 1 is a block diagram of binary adder 100, one embodiment of a binary adder according to the present invention. In this embodiment, N, the width of the adder, is eight bits. However, N can be 16 bits, 32 bits, 64 bits, 128 bits, 256 bits, 512 bits, or any other number of bits. In this embodiment, K, the number of stages to which a carry is limited, is four bits. However, K can be any number of bits less than N, and is preferably a factor of N. In this embodiment, an eight bit addend B is added to an eight bit augend A to form eight bit sum S. In this embodiment, adder 100 is constructed from two input AND, OR, and exclusive OR (XOR) gates according to well known techniques for calculating carry generate and carry propagate terms. However, the invention can be practiced with any combination of logic and circuit technology, such as but not limited to static MOS, dynamic MOS, TTL, or BCL, and any type of adder organization, such as but not limited to ripple carry and carry lookahead.

Adder 100 includes eight stages, bitslices 101–108. Bitslice 101 is the lowest order bitslice and as such there is no carry bit into bitslice 101. Bitslice 101 includes XOR gate 109 for calculating $S_0$ based only on operand bits $A_0$ and $B_0$. Each of the bitslices above bitslice 101 includes two XOR gates for calculating the corresponding sum bit based only on the corresponding operand bits and a carry bit from the preceding bitslice. For example, bitslice 102 includes XOR gates 110 and 117 for calculating $S_1$.

Each bitslice 101–108 also includes an AND gate, one of 124–131 respectively, for calculating a carry generate term, hereafter referred to as $G_0$–$G_7$ respectively, based only on the corresponding operand bits. Each of bitslices 102–108 also includes an OR gate, one of 132–138 respectively, for calculating a carry propagate term, hereafter referred to as $P_1$–$P_7$ respectively, based only on the corresponding operand bits.

The carry bits into bitslices 102–105 are calculated according to well known techniques. The carry bit into bitslice 102 is $G_0$. The carry bit into bitslice 103 is ($G_1$+$P_1G_0$), calculated from $G_1$, $P_1$, and $G_0$ using gates 139 and 146. The carry bit into bitslice 104 is ($G_2$+$P_2G_1$+$P_2P_1G_0$), calculated from $G_2$, $P_2$, $G_1$, $P_1$, and $G_0$ using gates 165, 159, 153, 147, and 140. The carry bit into bitslice 105 is ($G_3$+$P_3G_2$+$P_3P_2G_1$+$P_3P_2P_1G_0$), calculated from $G_3$, $P_3$, $G_2$, $P_2$, and ($G_1$+$P_1G_0$), using gates 166, 160, 154, 148, and 141, where the latter term is formed in bitslice 102.

Note that the carry bit into each of bitslices 102–105 is calculated based on all of the preceding augend bits and all of the preceding addend bits. In contrast, each of the carry bits into bitslices 106–108, as well as the overflow bit $C_{OUT}$, is limited to, or calculated based only on, the four preceding augend bits and the four preceding addend bits as will be described below. Hence, the carry bits into bitslices 106–108, as well as the overflow bit $C_{OUT}$, are referred to as limited carry bits. For each of the limited carry bits, there is a corresponding unlimited carry bit that is not calculated, where the unlimited carry bit is that which would be formed if the calculation were based on all of the preceding augend and addend bits.

The carry bit into bitslice 106 is limited carry bit ($G_4$+$P_4G_3$+$P_4P_3G_2$+$P_4P_3P_2G_1$), calculated from $G_4$, $P_4$, $G_3$, $P_3$, and ($G_2$+$P_2G_1$), using gates 167, 161, 155, 149, and 142, where the latter term is formed in bitslice 103. The corresponding unlimited carry bit is ($G_4$+$P_4G_3$+$P_4P_3G_2$+$P_4P_3P_2G_1$+$P_4P_3P_2P_1G_0$). The carry bit into bitslice 107 is limited carry bit ($G_5$+$P_5G_4$+$P_5P_4G_3$+$P_5P_4P_3G_2$), calculated from $G_5$, $P_5$, $G_4$, $P_4$, and ($G_3$+$P_3G_2$), using gates 168, 162, 156, 150, and 143, where the latter term is formed in bitslice 104. The corresponding unlimited carry bit is ($G_5$+$P_5G_4$+$P_5P_4G_3$+$P_5P_4P_3G_2$+$P_5P_4P_3P_2G_1$+$P_5P_4P_3P_2P_1G_0$). The carry bit into bitslice 108 is limited carry bit ($G_6$+$P_6G_5$+$P_6P_5G_4$+$P_6P_5P_4G_3$), calculated from $G_6$, $P_6$, $G_5$, $P_5$, and ($G_4$+$P_4G_3$), using gates 169, 163, 151, and 144, where the latter term is formed in bitslice 105. The corresponding unlimited carry bit is ($G_6$+$P_6G_5$+$P_6P_5G_4$+$P_6P_5P_4G_3$+$P_6P_5P_4P_3G_2$+$P_6P_5P_4P_3P_2G_1$+$P_6P_5P_4P_3P_2P_1G_0$). The overflow bit $C_{OUT}$ is limited carry bit ($G_7$+$P_7G_6$+$P_7P_6G_5$+$P_7P_6P_5G_4$), calculated from $G_7$, $P_7$, $G_6$, $P_6$, and ($G_5$+$P_5G_4$), using gates 170, 164, 158, 152, and 145, where the latter term is formed in bitslice 106. The corresponding unlimited carry bit is ($G_7$+$P_7G_6$+$P_7P_6G_5$+$P_7P_6P_5G_4$+$P_7P_6P_5P_4G_3$+$P_7P_6P_5P_4P_3G_2$+$P_7P_6P_5P_4P_3P_2P_1G_0$).

Note that bitslices 101–104 form a four bit adder for calculating bits $S_3$–$S_0$. Bitslice circuit 105, for calculating bit $S_4$, comprises a certain bitslice circuit configuration. Each of bitslices 106–108, for calculating bits $S_7$–$S_5$, include the same bitslice circuit configuration. For example, gates 129, 136, 143, 150, 156, 162, 168, 114, and 121 in bitslice 106 form a circuit in the same configuration as the circuit formed by gates 128, 135, 142, 149, 150, 161, 167, 113, and 120 in bitslice 105. Therefore, each of sum bits $S_7$–$S_5$ are calculated with the same latency as sum bit $S_4$. Also, bitslices 104–103 comprise the same bitslice circuit configuration, although that is not required by the present invention. Therefore, the latency of calculating the eight bit sum $S_7$–$S_0$ is no greater than that of calculating the four bit sum $S_3$–$S_0$.

Aside from an overflow condition, the eight bit sum $S_7$–$S_0$ is accurate unless any of the limited carry bits into the highest three stages differs from the corresponding unlimited carry bit. A given limited carry bit can differ from the corresponding unlimited carry bit only if no carry is generated in any of the four stages to which the carry calculation is limited, but a carry could propagate through all of those four stages. For example, the carry into bitslice 108, ($G_6$+$P_6G_5$+$P_6P_5G_4$+$P_6P_5P_4G_3$), can differ from the corresponding unlimited carry bit, ($G_6$+$P_6G_5$+$P_6P_5G_4$+$P_6P_5P_4G_3$+$P_6P_5P_4P_3G_2$+$P_6P_5P_4P_3P_2G_1$+$P_6P_5P_4P_3P_2P_1G_0$) only under the condition that none of $G_6$–$G_3$ is a logical one, but the term $P_6P_5P_4P_3$ is a logical one. This condition exists only if for each of the corresponding augend bits $A_6$–$A_3$, one and only one of the augend bit and the corresponding addend bit is a logical one. In other words, the condition exists only when each of ($A_6$ XOR $B_6$), ($A_5$ XOR $B_5$), ($A_4$ XOR $B_4$), and ($A_3$ XOR $B_3$) is a logical one. Under condition there is a potential difference between the limited carry bit and the unlimited carry bit. A potential error in the sum resulting from the speculative calculation of bits $S_7$–$S_5$ exists when for any of bits $S_7$–$S_5$ there is a potential difference between the carry bit limited to the four preceding stages and the corresponding unlimited carry bit. A potential error in the overflow bit $C_{OUT}$ also exists when there is a potential difference between the corresponding limited carry bit and the corresponding unlimited carry bit.

Adder 100 includes circuitry for detecting a potential error. Each of bitslices 105–108 includes a circuit, one of gates 171–174 respectively, for detecting a potential difference between the limited carry bit out of that bitslice and the corresponding unlimited carry bit. For example, bitslice 107 includes AND gate 173 for calculating the term ($A_6$ XOR $B_6$)($A_5$ XOR $B_5$)($A_4$ XOR $B_4$)($A_3$ XOR $B_3$) from ($A_6$ XOR $B_6$)($A_5$ XOR $B_5$) and ($A_4$ XOR $B_4$)($A_3$ XOR $B_3$), where the former term is formed with AND gate 182 in bitslice 107 and the latter term is formed with AND gate 180 in bitslice 105. Adder 100 includes gates 175–177 for calculating whether a potential error exists based on any output from gates 171–174.

Other approaches to detecting a potential difference between the limited carry out bit of a bitslice and the corresponding unlimited carry bit. In one alternative embodiment, a potential difference is detected when a carry could propagate through all of the stages to which the carry is limited, without regard to whether a carry is generated in any of those stages. One disadvantage of this alternative embodiment is that the correction rate will be higher because potential differences will be detected when in fact there can be no difference. However, this alternative embodiment can possibly provide an advantage in area or speed depending on the logic or circuit technology chosen to implement the invention.

Figure 2:
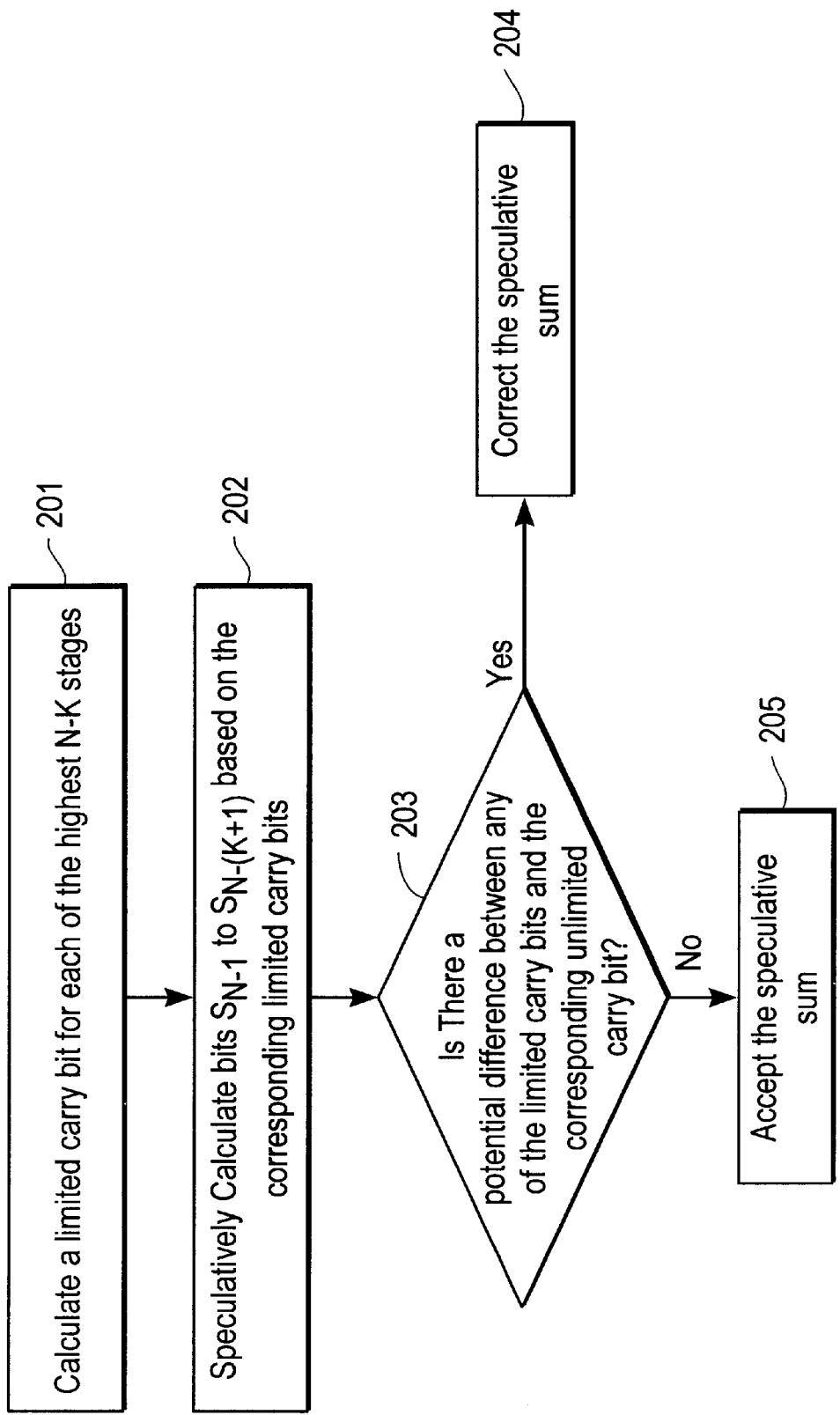
FIG. 2 is a flow chart illustrating one embodiment of a method of addition according to the present invention.

FIG. 2 is a flow chart illustrating one embodiment of the method of the present invention. In step 201, limited carry bits out of each of the highest N–K stages are calculated. Each limited carry bit is based only on K bits of the augend and K bits of the addend, where the K bits are the bits into the stage for calculating the limited carry bit and the preceding K–1 stages. In step 202, bits $S_{N-1}$ to $S_{N-(K+1)}$ are speculatively calculated based on the corresponding limited carry bits. In step 203, a potential difference between any limited carry bit and the corresponding unlimited carry bit, if one exists, is detected as described above. Steps 202 and 203 can overlap such that the latency of detecting a potential error is the same or less than the latency of calculating the speculative sum.

If a potential difference is detected in step 203, the speculative sum is corrected in step 204 in a number of ways. In one approach, adder 100 includes an additional four bit adder, accomodating a carry into the lowest bit, for recalculating the four high order bits of the sum. In another approach, adder 100 includes hardware for saving the original bits $S_4$–$S_0$, multiplexing the carry bit out of bitslice 104 into bitslice 101, multiplexing operand bits $A_3$–$A_0$ and $B_3$–$B_0$ through bitslices 104–101, and shifting the output from bitslices 104–101 up four stages. In an embodiment where N–K is greater than K, the speculative sum can be recalculated serially in groups of K bits. In each of these approaches, it is preferable to perform the correction during a clock cycle or cycles following the calculation of the speculative sum rather than during the clock cycle in which the speculative sum is calculated, such that the adder can be used with a clock frequency according to the typical latency of the adder, that is, the latency of calculating the speculative sum.

If, on the other hand, a potential difference is not detected in step 203, then the speculative sum is accepted, and an accurate N bit sum has been calculated with the latency of a K bit adder.

Thus, the exemplary embodiments of the present invention illustrated by FIG. 1 and FIG. 2 have been described. However, the invention is not limited to these embodiments or any of the details described. The specification and drawings must be regarded in an illustrative rather than a restrictive sense. The scope of the invention is defined by the following claims.

What is claimed is:

1. An adder having an adder width N, for calculating an N bit sum S from an N bit augend A and an N bit addend B, said adder having a plurality of bit slices, each bitslice N comprising:

a first circuit for speculatively calculating bit $S_N$ based only on bit $A_N$, bit $B_N$, and a limited carry bit;

a second circuit for calculating said limited carry bit based only on K bits of said augend and K bits of said addend, wherein K is less than N–1; and a third circuit for detecting a potential difference between said limited carry bit and an unlimited carry bit;

wherein the adder latency is related to the number of bits, K, in the second circuit;

so that the adder latency is independent of the adder width N.

2. The adder of claim 1 wherein:

said K bits of said augend are bits $A_{N-1}$ to $A_{N-K}$; and said K bits of said addend are bits $B_{N-2}$ to $B_{N-K}$.

3. The adder of claim 2 wherein said potential difference exists when for each of the K bits of said augend, one of said augend bit and the corresponding addend bit is a logical one.

4. An adder having an adder width N, for calculating an N bit sum S from an N bit augend A and an N bit addend B, said adder comprising:

a K bit adder for calculating the bits $S_{K-1}$ to $S_0$;

a first bitslice for calculating bit $S_K$, said first bitslice comprising a bitslice circuit configuration; and N–(K+1) additional bitslices for speculatively calculating bits $S_{N-1}$ to $S_{K+1}$, each additional bitslice comprising the bitslice circuit configuration;

wherein the adder latency is related to the number of bits, K, in the K bit adder;

so that the adder latency is independent of the adder width N.

5. The adder of claim 4 wherein said K bit adder comprises a carry lookahead adder.

6. The adder of claim 4 further comprising error detection logic for detecting a potential error in said sum resulting from the speculative calculation of bits $S_{N-1}$ to $S_{K+1}$.

7. The adder of claim 6 wherein said potential error exists when for each of the preceding K bits of any of bits $S_{N-1}$ to $S_{K+1}$, one of the corresponding augend bit and the corresponding addend bit is a logical one.

8. An adder having an adder width N, for calculating an N bit sum S from an N bit augend A and an N bit addend B, wherein N is greater than 16, said adder comprising:

a 16 bit adder for calculating the bits $S_{15}$ to $S_0$;

a first bitslice for calculating bit $S_{16}$, said first bitslice comprising a bitslice circuit configuration; and N–17 additional bitslices for speculatively calculating bits $S_{N-1}$ to $S_{17}$, each additional bitslice comprising the bitslice circuit configuration;

wherein the adder latency is related to the 16 bit adder, so that the adder latency is independent of the adder width N.

9. A method of calculating an N bit sum S from an N bit augend A and an N bit addend B, in an adder having an adder width N, said method comprising:

calculating a plurality of limited carry bits each based only on K bits of said augend and K bits of said addend;

speculatively calculating a plurality of bits $S_N$ each based only on bit $A_N$, bit $B_N$, and a corresponding limited carry bit; and detecting a potential difference between said limited carry bits and unlimited carry bits.

10. The method of claim 9 wherein the step of calculating a limited carry bit N comprises a step of calculating the limited carry bit based only on bits $A_{N-1}$ to $A_{N-K}$ and bits $B_{N-1}$ to $B_{N-K}$.

11. The method of claim 10 wherein the step of detecting a potential difference comprises a step of detecting the potential difference when for each of the K bits of said augend, one of said augend bit and the corresponding addend bit is a logical one.

\* \* \* \* \*

UNITED STATES PATENT AND TRADEMARK OFFICE
CERTIFICATE OF CORRECTION

PATENT NO. : 6,631,393 B1
DATED : October 7, 2003
INVENTOR(S) : Dai

It is certified that error appears in the above-identified patent and that said Letters Patent is hereby corrected as shown below:

Column 3,
Line 7, delete "BCL", insert -- ECL --.

Column 6,
Line 5, delete "$B_{N-2}$", insert -- $B_{N-1}$ --.
Line 40, delete "$S_{N-}1$", insert -- $S_{N-1}$ --.

Signed and Sealed this

Sixth Day of January, 2004

JAMES E. ROGAN
*Director of the United States Patent and Trademark Office*